No. 739,652. PATENTED SEPT. 22, 1903.
J. C. DALRYMPLE.
AX HANDLE PROTECTOR.
APPLICATION FILED MAY 2, 1903.
NO MODEL.
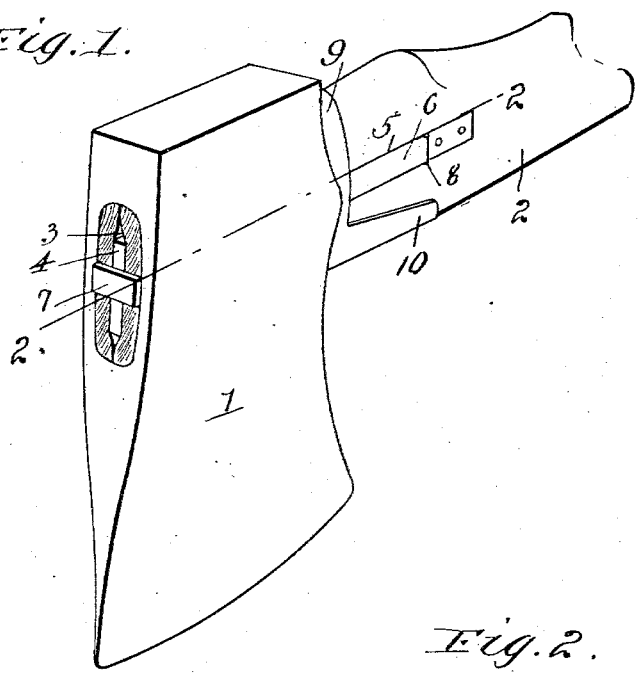
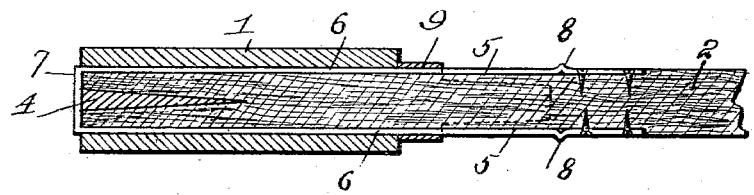
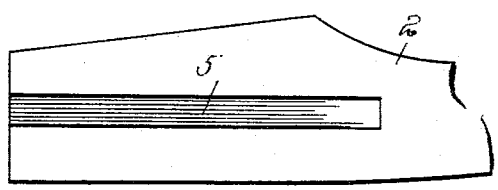
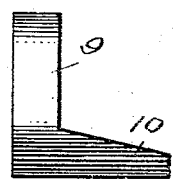
WITNESSES:
Edwin L. Yewell
R. H. Bishop
INVENTOR
J. C. Dalrymple
BY
Davis & Davis
ATTORNEYS.

No. 739,652.                                                    Patented September 22, 1903.

UNITED STATES PATENT OFFICE.

JAMES C. DALRYMPLE, OF MOBILE, ALABAMA.

AX-HANDLE PROTECTOR.

SPECIFICATION forming part of Letters Patent No. 739,652, dated September 22, 1903.

Application filed May 2, 1903. Serial No. 155,252. (No model.)

*To all whom it may concern:*

Be it known that I, JAMES C. DALRYMPLE, a citizen of the United States, residing at Mobile, county of Mobile, State of Alabama, have invented certain new and useful Improvements in Ax-Handle Protectors, of which the following is a specification, reference being had therein to the accompanying drawings, in which—

Figure 1 is a perspective view of an ax, showing the handle provided with the protector; Fig. 2, a horizontal sectional view on the line 2 2 of Fig. 1; Fig. 3, a detail view of the handle detached; Fig. 4, a detail view of the protecting-ring.

The main object of this invention is to provide means for strengthening a wooden ax-handle and to so protects aid handle as to prevent its breaking sidewise near the ax-head.

A further object of this invention is to provide a device of the class described which may be readily placed on the ax-handle and which will prevent the accidental displacement of the ax-head.

Referring to the various parts by numerals, 1 designates the ax-head, and 2 the handle thereof. Said handle at the end designed to receive the ax is provided with a longitudinal opening or split 3 to receive the retaining-wedge 4 and with the longitudinal groove 5 in each side. These grooves are designed to receive the arms 6 of the U-shaped strengthening-yoke 7, which yoke is fitted over the end of the ax-handle and not only greatly strengthens the handle, but also retains the wedge in place at the end thereof. The purpose of this strengthening-yoke is to so reinforce the handle at the ax-head and for a considerable distance inward therefrom as to prevent the handle being broken near the ax-head by sidewise strains. As is well known among lumbermen, great numbers of ax-handles are broken at the ax-head when the ax is used to pry off chips, which use puts considerable sidewise strain on the handle and especially near the head of the ax. The arms of the yoke effectually resist this strain. The arms of this yoke are provided at their free ends with small openings through which may be passed screws or bolts to secure the strengthening-yoke to the handle. Just forward of the retaining-screws each arm of the yoke is bent to form the outstanding flange or rib 8. The purpose of these flanges or ribs is to permit the handle to have the required spring. Without these flanges or ribs the arms of the yoke would make the handle too stiff and rigid near the ax-head, it being well known that an ax-handle must possess a certain spring in order that the best results may be obtained with the ax.

On the ax-handle adjacent the ax is tightly fitted a wearing-ring 9, said wearing-ring also embracing the arms of the yoke at that place. This wearing-ring at its under side is provided with the longitudinal extension 10, which fits closely against the under side of the ax-handle.

In assembling the parts the handle is first reduced to snugly fit within the opening in the ax. The wearing-ring is then driven on the handle and the ax then placed on the handle and driven inward to its final position, the inner side of the ax contacting with the wearing-ring and forcing said ring to its final position. The wedge is next placed in position in the recess formed in the end of the handle and then the ends of the arms of the strengthening-yoke are placed in the grooves in the sides of the handle and are forced thereinto until the transverse member of said yoke contacts with the rear end of the wedge. The yoke and wedge are then driven inward together until the yoke contacts with the rear end of the handle. To secure the yoke to the handle, screws or nails are passed through the inner ends of the arms thereof and into the handle. It will thus be seen that the handle is greatly strengthened by the yoke to resist sidewise strains. This is very important. It will also be noted that the handle is securely fastened within the ax and that the wearing-ring and the extension thereof will take up all of the wear that is ordinarily received by the under side of the handle near the ax. The yoke effectually prevents the displacement of the retaining-wedge. Therefore the ax will be permanently secured to the handle.

Having thus described my invention, what I claim as new, and desire to secure by Letters Patent, is—

1. The combination of an ax-handle provided with longitudinal grooves in its sides at the end designed to receive the ax-head, a wedge adapted to enter the end of said ax-handle between said grooves, and a strengthening-yoke whose arms are adapted to enter the grooves in the ax-handle, the cross-bar of said yoke extending across the end of the handle.

2. The combination of an ax-handle provided with longitudinal grooves in its sides at the end designed to receive the ax-head, a wedge adapted to enter the end of said ax-handle between said grooves, and a strengthening-yoke having arms adapted to enter the grooves in the ax-handle and extend inward beyond the inner side of the ax-head, the cross-bar of said yoke extending across the wedge and retaining it in position in the handle, and means for attaching the inner free ends of the arms of the yoke to the handle.

3. The combination of an ax-handle provided with longitudinal grooves in its sides at the end designed to receive the ax-head, a wedge adapted to enter the end of said handle between said grooves, a substantially U-shaped yoke having arms adapted to enter the grooves in the ax-handle and extend inward beyond the inner side of the ax-head, the cross-bar of said yoke extending across the wedge and retaining it in position in the handle, means for attaching the inner free ends of the arms of the yoke to the handle, and a wearing-ring secured on the handle adjacent the inner face of the ax and embracing the arms of the yoke at that point.

4. The combination of an ax-handle provided with longitudinal grooves in its sides at the end designed to receive the ax-head, a wedge adapted to enter the end of said ax-handle between said grooves, a substantially U-shaped yoke having arms adapted to enter the grooves in the handle and extend inward beyond the inner side of the ax-head, the cross-bar of said yoke extending across the wedge and retaining it in position in the handle, means for attaching the inner ends of the arms of the yoke to the handle, a wearing-ring secured on the ax-handle adjacent the inner face of the ax-head and embracing the arms of the yoke at that point, and provided with an inward-projecting extension fitting closely against the under side of the ax-handle, substantially as described.

In testimony whereof I hereunto affix my signature, in the presence of two witnesses, this 21st day of January, 1903.

JAMES C. DALRYMPLE.

Witnesses:
CHAS. J. CUSTER, Sr.,
W. C. CLAIBORNE.